US010850339B2

(12) United States Patent
Arcioni et al.

(10) Patent No.: US 10,850,339 B2
(45) Date of Patent: Dec. 1, 2020

(54) GEOMETRIC CONTROL AND BEST FITTING OF ELECTRIC DISCHARGE MACHINING TOOLS

(71) Applicant: Nuovo Pignone Srl, Florence (IT)

(72) Inventors: Massimo Arcioni, Florence (IT); Claudio Bartali, Florence (IT)

(73) Assignee: Nuovo Pignone Srl, Florence (IT)

( * ) Notice: Subject to any disclaimer, the term of this patent is extended or adjusted under 35 U.S.C. 154(b) by 875 days.

(21) Appl. No.: 15/512,179

(22) PCT Filed: Sep. 16, 2015

(86) PCT No.: PCT/EP2015/071215
§ 371 (c)(1),
(2) Date: Mar. 17, 2017

(87) PCT Pub. No.: WO2016/042026
PCT Pub. Date: Mar. 24, 2016

(65) Prior Publication Data
US 2017/0259363 A1    Sep. 14, 2017

(30) Foreign Application Priority Data

Sep. 17, 2014  (IT) .................................. FI2014A0210

(51) Int. Cl.
*B23H 9/10* (2006.01)
*B23H 1/04* (2006.01)
(Continued)

(52) U.S. Cl.
CPC ................. *B23H 9/10* (2013.01); *B23H 1/04* (2013.01); *B23H 7/18* (2013.01); *B23H 7/20* (2013.01);
(Continued)

(58) Field of Classification Search
CPC ... B23H 1/04; B23H 7/18; B23H 7/20; B23H 9/10; B23H 2600/10; B23H 2600/00;
(Continued)

(56) References Cited

U.S. PATENT DOCUMENTS 5,224,048 A    6/1993  Ohba et al.
6,225,589 B1 *  5/2001  Bartok .................... B23H 7/265
                                                      219/69.15
(Continued)

FOREIGN PATENT DOCUMENTS

CN    102596474 A    7/2012
CN    103084676 A    5/2013
(Continued)

OTHER PUBLICATIONS

Rapid tooling aided by reverse engineering to manufacture EDM electrodes, published Aug. 30, 2006, Jose Carvalho Ferreira, Artur S. Mateus and Nuno F. Alves, The International Journal of Advanced Manufacturing Technology (Year: 2006).*

(Continued)

*Primary Examiner* — Dana Ross
*Assistant Examiner* — James F Sims, III
(74) *Attorney, Agent, or Firm* — Baker Hughes Patent Org.

(57) ABSTRACT

A method for checking a geometry of an electric discharge machining electrode is described. The method comprises the following steps: providing a file containing a native 3D-model of the electric discharge machining electrode; providing a manufactured electric discharge machining electrode based on the native 3D-model; light scanning a set of images of the manufactured electric discharge machining electrode in different positions and generating therewith a scanned 3D-model of the manufactured electric discharge machining electrode; comparing the native 3D-model and (Continued)

the scanned 3D-model and generating electrode compensation coordinates for an electric discharge machining apparatus, to correct an electrode path during electric discharge machining.

15 Claims, 8 Drawing Sheets

(51) Int. Cl.
    *B23H 7/18*     (2006.01)
    *G05B 19/404*     (2006.01)
    *B23H 7/20*     (2006.01)

(52) U.S. Cl.
    CPC .. *G05B 19/404* (2013.01); *G05B 2219/45221* (2013.01); *G05B 2219/45225* (2013.01); *G05B 2219/50285* (2013.01)

(58) Field of Classification Search
    CPC ........ G05B 19/404; G05B 2219/45221; G05B 2219/45225; G05B 2219/50285; B23Q 17/2452; B23Q 17/2457; B23Q 17/2409
    USPC ........ 219/69.13, 69.15, 69.17, 69.2; 382/152
    See application file for complete search history.

(56) References Cited

U.S. PATENT DOCUMENTS

2012/0240386 A1     9/2012     Cantelli et al.
2013/0024021 A1*     1/2013     Atabey ................ G05B 19/404
                                        700/176

FOREIGN PATENT DOCUMENTS

| CN | 103240473 A | 8/2013 |
| CN | 103934521 A | 7/2014 |
| DE | 43 31 253 A1 | 3/1995 |
| DE | 4331253 A1 | 3/1995 |

OTHER PUBLICATIONS

First Office Action and Search issued in connection with corresponding CN Application No. 201580050321.5 dated Jul. 18, 2018 (English Translation not available).
Search Report issued in connection with corresponding IT Application No. FI2014A000210 dated May 8, 2015.
International Search Report and Written Opinion issued in connection with corresponding PCT Application No. PCT/EP2015/071215 dated Nov. 11, 2015.
International Preliminary Report on Patentability issued in connection with corresponding PCT Application No. PCT/EP2015/071215 dated Mar. 21, 2017.

* cited by examiner

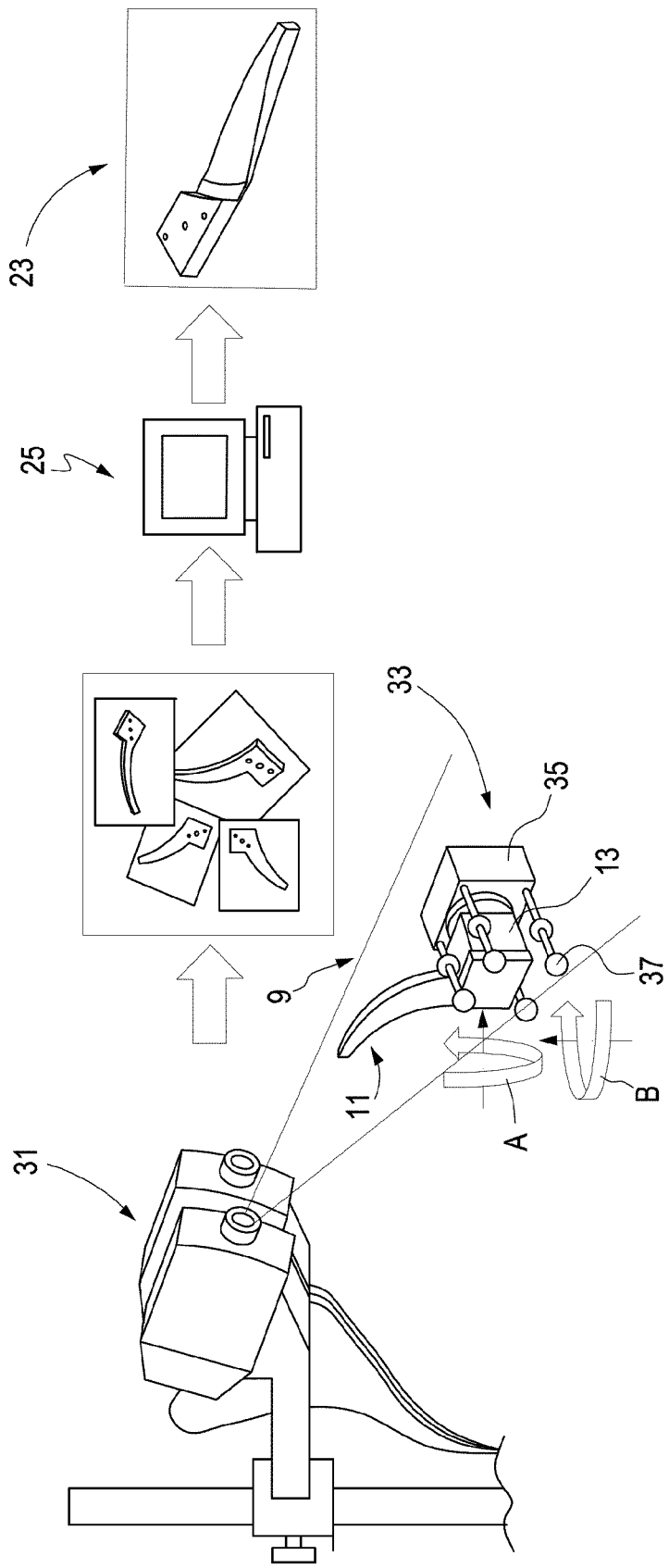

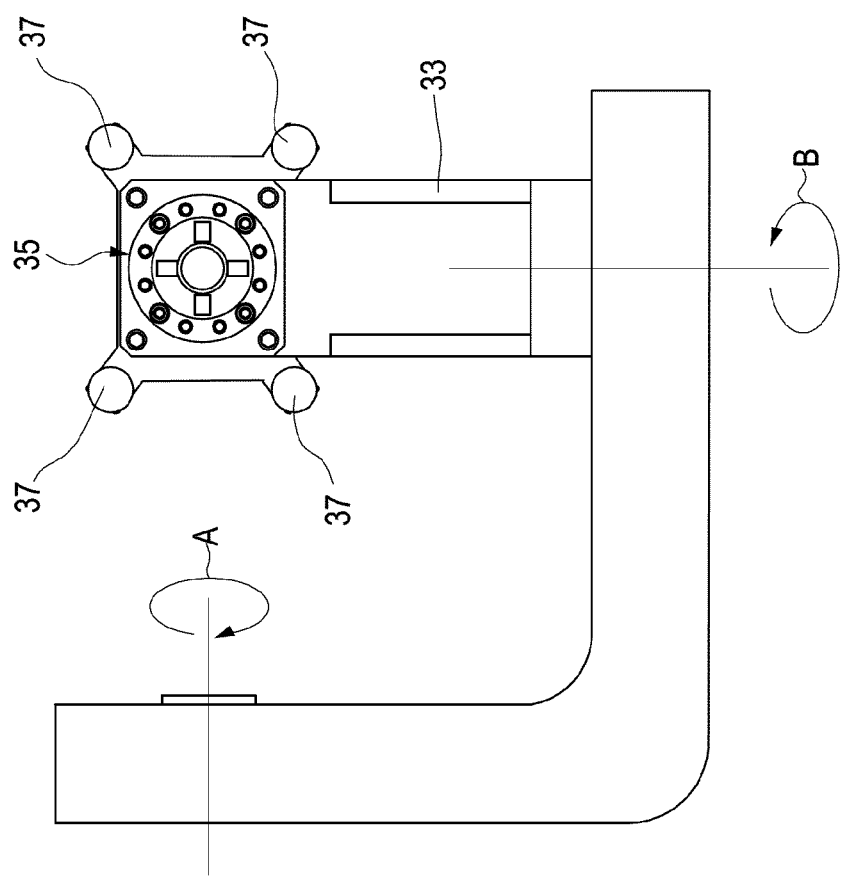
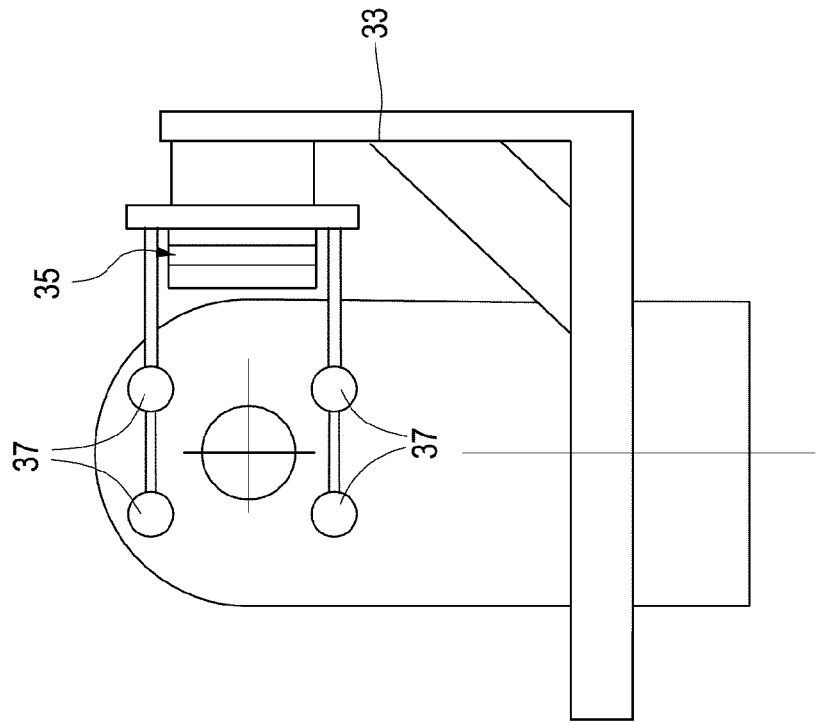

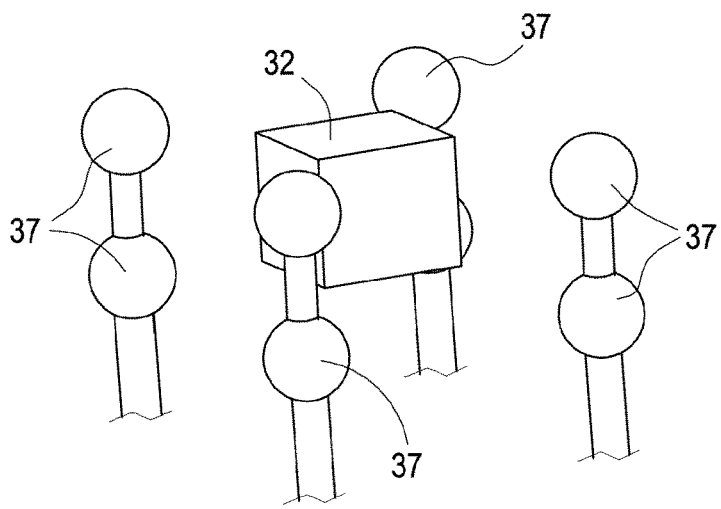
Fig.7
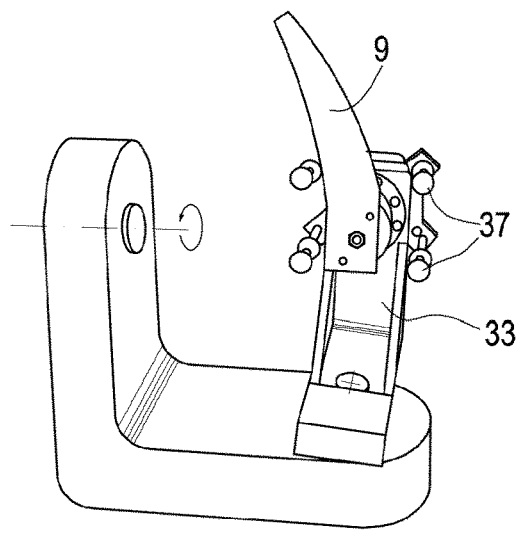
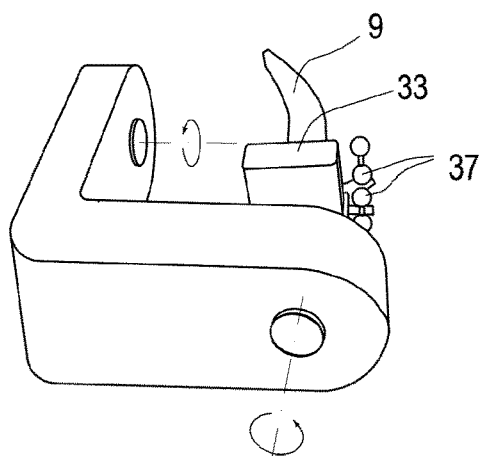
Fig.8
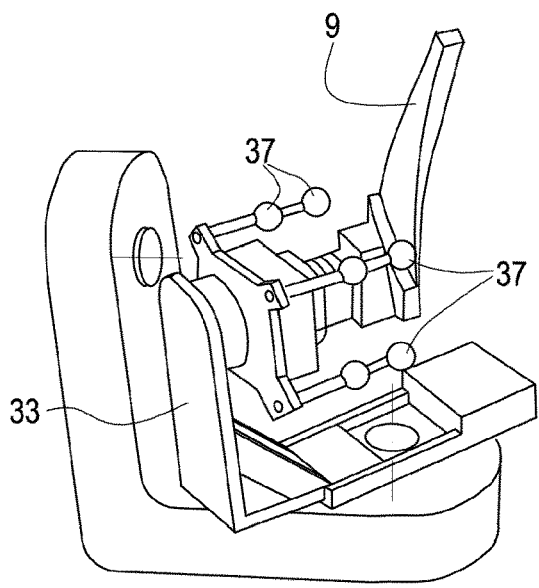

GEOMETRIC CONTROL AND BEST FITTING OF ELECTRIC DISCHARGE MACHINING TOOLS

BACKGROUND

The present disclosure relates to electric discharge machining. More specifically, the disclosure relates to manufacturing of electrodes or tools used for machining impellers of turbomachines, such as but not limited to centrifugal pumps and compressors centrifugal.

Impellers for centrifugal turbomachines usually comprise a disk or hub with a plurality of blades extending therefrom and defining a plurality of vanes, where through the fluid processed by the turbomachine flows. In some embodiments, the impeller is further comprised of a shroud, which is connected to the disk by the blades arranged between the disk and the shroud.

According to some known methods, centrifugal impellers are manufactured by electric discharge machining ("EDM"). EDM is a thermal erosion process, in which metal is removed by a series of recurring electrical discharges between an electric discharge machining tool or electrode and a conductive workpiece in the presence of a dielectric liquid. The electric discharge occurs in a voltage gap between the electrode and the workpiece. Heat generated by the electric discharge vaporizes particles of the workpiece material. These particles are washed from the gap by the continuously flushing dielectric liquid.

When EDM is used, a starting disk-shaped workpiece of steel or other suitable material is subjected to repeated action of a series of electric discharge machining tools or electrodes. Electrodes or tools of different shapes are used in sequence. A first tool with a first electrode is used to start machining of cavities in the workpiece. Tools of different shapes are then used sequentially, until complete ducts are formed between consecutive blades arranged between the disk and the shroud of the impeller.

The shape and dimension of the blade surfaces as well as of the inner disk and shroud surfaces must be accurate and correspond to a native 3D-model (i.e. a CAD 3D-model) of the impeller, based on fluid dynamic and structural design considerations. The efficiency of the turbomachine largely depends upon the machining accuracy of the turbomachine impellers.

EDM electrodes are in turn manufactured by chip removal using materials having a high electrical conductivity and high melting temperature, such as copper or graphite. The EDM tool is in general comprised of an electrode and a mounting support, whereon the electrode is mounted. The tool is in turn mounted on the ram or tool holder of the EDM apparatus. CNC controlled axes of the EDM apparatus move the tool with respect to the workpiece, to generate machined surfaces having a shape corresponding to the shape of the EDM electrode. Geometrical errors generated during manufacturing of the EDM electrode as well as misalignments due to incorrect coupling between electrode and mounting support result in inaccurate machining of the workpiece. In case of turbomachine impellers this can in turn results in poor efficiency of the turbomachine. In some cases the machined impeller must be discarded, since it does not meet the strict design tolerances.

According to the current art, the accuracy of EDM electrode geometry is checked using CMM technology. A mechanical probe is moved against the electrode in a pre-determined set of points. A dedicated software checks if the actual position of these points meet the design tolerances. This known method of checking the EDM electrode is expensive and time consuming, especially since a dedicated part-program is needed for the CMM to check each EDM electrode. Moreover, the accuracy of the known systems is not satisfactory.

There is accordingly a need for a more efficient, more accurate and less time consuming method for checking the accuracy of an EDM electrode and tool.

SUMMARY OF THE INVENTION

An exemplary embodiment of the present invention provides a method for checking a geometry of an electric discharge machining electrode, which more efficiently checks the EDM electrode. According to embodiments of the subject matter disclosed herein, the method comprises the following steps: providing a file containing a native 3D-model of the electric discharge machining electrode; providing a manufactured electric discharge machining electrode based on the native 3D-model; scanning a set of images of the manufactured electric discharge machining electrode in different positions and generating therewith a scanned 3D-model of the manufactured electric discharge machining electrode; comparing the native 3D-model and the scanned 3D-model and generating electrode compensation coordinates for an electric discharge machining apparatus, to correct an electrode path during electric discharge machining.

According to some embodiments, the method can further include the following steps: defining a set of points on the surface of the electric discharge machining electrode in the native 3D-model; generating a set of geometrical elements, for instance spheres, centered at said points in the native 3D-model; projecting said set of points on the surface of the electric discharge machining electrode in the scanned 3D-model of the manufactured electric discharge machining electrode; applying a set of geometrical elements, for instance small spheres, centered at said points projected on the surface of the scanned 3D-model of the manufactured electric discharge machining electrode; displacing the scanned 3D-model of the manufactured electric discharge machining electrode with respect to the native 3D-model to minimize a distance between the geometrical elements on the native 3D-model and the geometrical elements on the scanned 3D-model of the manufactured electric discharge machining electrode.

According to some embodiments, the step of displacing the scanned 3D-model of the manufactured electric discharge machining electrode with respect to the native 3D-model includes the steps of: rotating the scanned 3D-model of the manufactured electric discharge machining electrode around a rotation axis, and translating the scanned 3D-model of the manufactured electric discharge machining electrode along at least one translation axis.

Features and embodiments are disclosed here below and are further set forth in the appended claims, which form an integral part of the present description. The above brief description sets forth features of the various embodiments of the present invention in order that the detailed description that follows may be better understood and in order that the present contributions to the art may be better appreciated. There are, of course, other features of the invention that will be described hereinafter and which will be set forth in the appended claims. In this respect, before explaining several embodiments of the invention in details, it is understood that the various embodiments of the invention are not limited in their application to the details of the construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which the disclosure is based, may readily be utilized as a basis for designing other structures, methods, and/or systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

A more complete appreciation of the disclosure and many of the attendant advantages thereof will be better understood by reference to the following detailed description and the accompanying drawings, wherein:

FIG. 5 schematically illustrates an exemplary embodiment of the step of scanning images of an electric discharge machining electrode;

FIGS. 6A and 6B illustrate an exemplary embodiment of a tilting and rotating table of the light scanning arrangement or device;

FIG. 7 illustrates an exemplary embodiment of a scanned image of reference spheres and of a qualified cube obtained during a set-up step of the light scanning arrangement or device;

FIG. 8 illustrates an exemplary embodiment of different steps of light scanning the electrode with the light scanning device of FIGS. 5, 6A and 6B;

DETAILED DESCRIPTION

The following detailed description of the exemplary embodiments refers to the accompanying drawings. The same reference numbers in different drawings identify the same or similar elements. Additionally, the drawings are not necessarily drawn to scale. Also, the following detailed description does not limit the invention. Instead, the scope of the invention is defined by the appended claims.

Reference throughout the specification to "one embodiment" or "an embodiment" or "some embodiments" means that the particular feature, structure or characteristic described in connection with an embodiment is included in at least one embodiment of the subject matter disclosed. Thus, the appearance of the phrase "in one embodiment" or "in an embodiment" or "in some embodiments" in various places throughout the specification is not necessarily referring to the same embodiment(s). Further, the particular features, structures or characteristics may be combined in any suitable manner in one or more embodiments.

Figure 1:
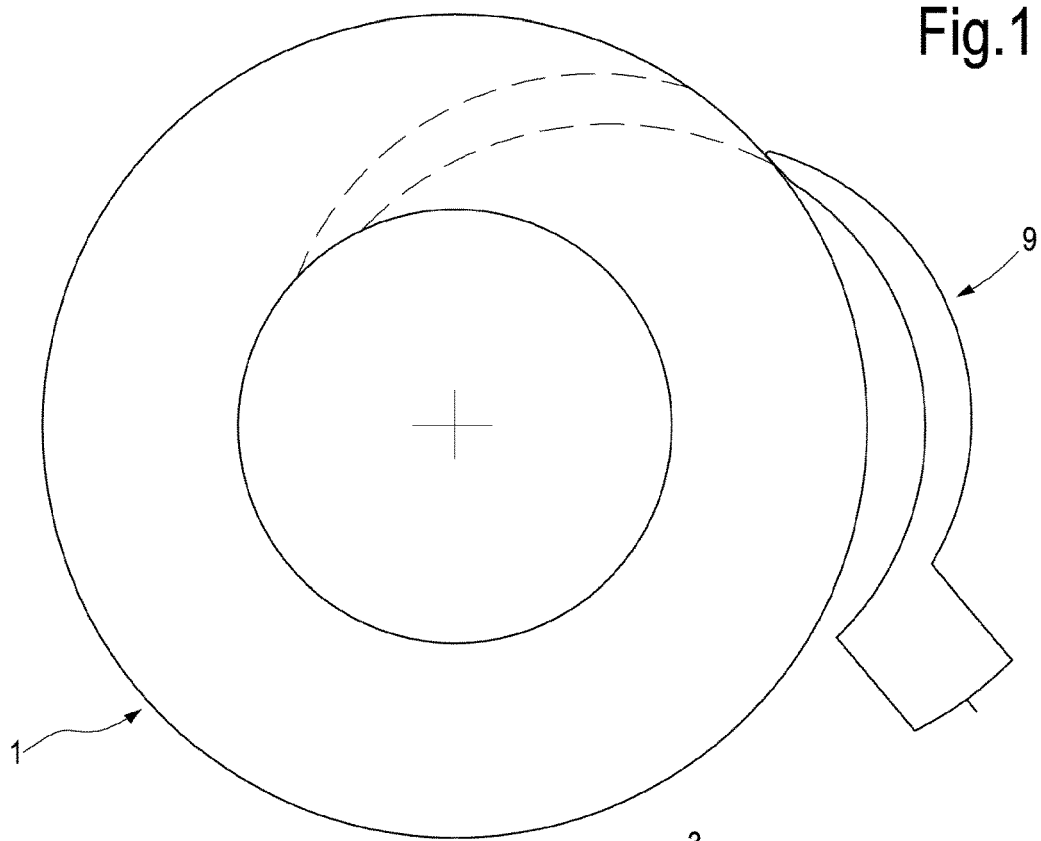
FIGS. 1 and 2 schematically illustrate exemplary embodiments of a turbomachine impeller being machined by means of electric discharge machining.
Figure 2:
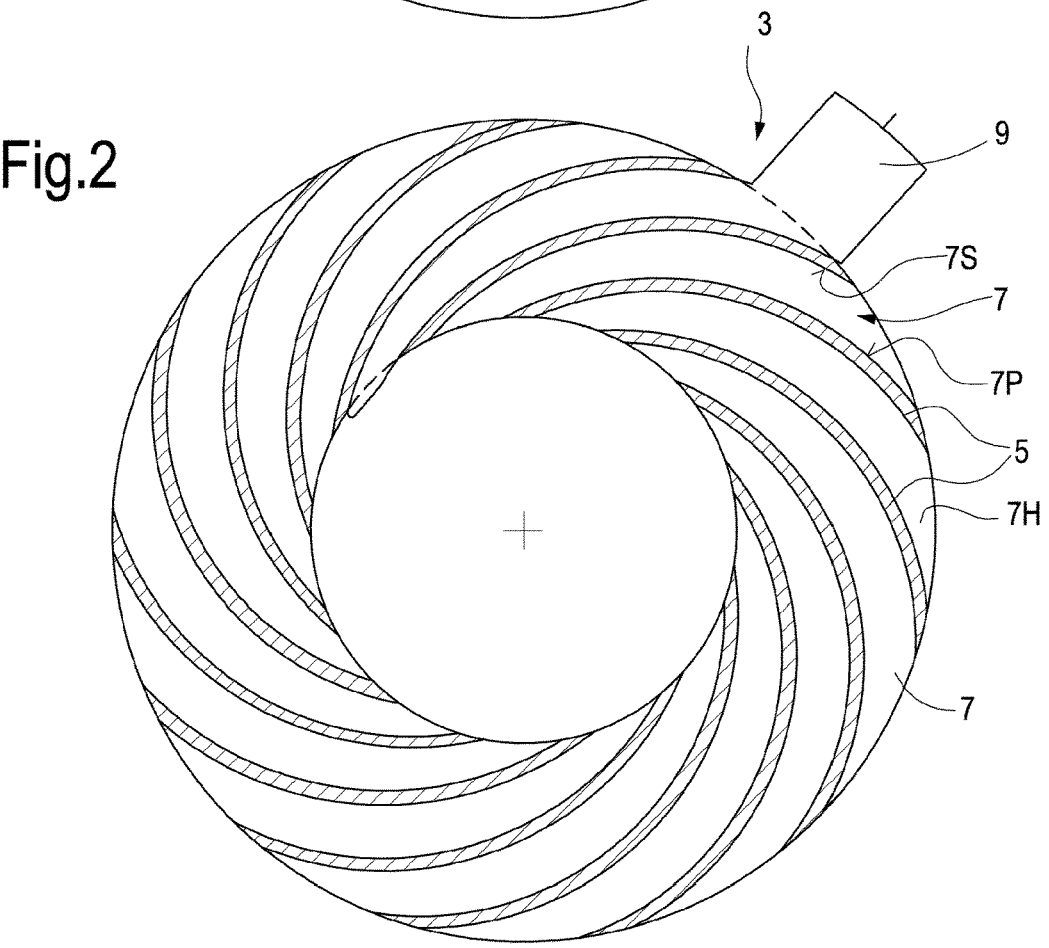

FIGS. 1 and 2 schematically illustrate the use of EDM (Electric Discharge Machining) tools for manufacturing an impeller of a centrifugal compressor or centrifugal pump. More specifically, FIG. 1 illustrates a front view of a workpiece 1, which is machined with one or more EDM tools of different shape, used in sequence to obtain an impeller 3 with a plurality of blades 5 defining flow vanes 7 therebetween.

FIG. 2 illustrates a cross sectional view of the impeller, once blades 5 have been machined therein. Reference number 9 designates one of a plurality of EDM tools, which are used for machining the impeller 3.

Reference numbers 7S, 7P and 7H designate a suction surface, a pressure surface and a hub surface of the vane 7, respectively. Each vane further comprises a shroud surface, opposite the hub surface 7H, not shown in the drawing. The EDM tool 9 has correspondingly surfaces, which machine the suction surface, pressure surface, hub surface and shroud surface of the vane 7.

As known to those skilled in the art, complete machining of the impeller usually requires the use of different tools in sequence, which gradually generate the blades 5 and the flow vanes 7 in their final shape. EDM manufacturing of impellers for centrifugal turbomachines is well known in the art and will not be described herein in greater detail.

Figure 3:
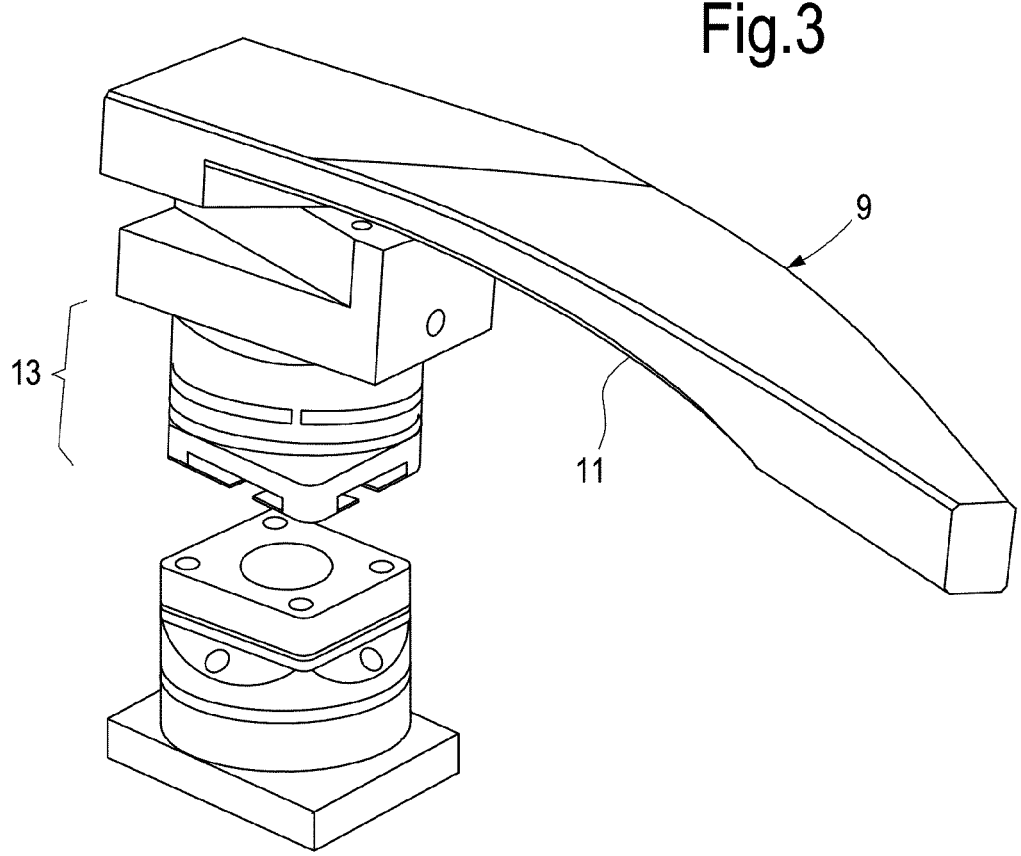
FIG. 3 illustrates an exemplary embodiment of a native 3D-model of an electric discharge machining electrode mounted on a respective support, forming an electric discharge machining tool.

FIG. 3 illustrates an axonometric view of an exemplary EDM tool which can be used for machining an impeller 3. The EDM tool of FIG. 3 is again labeled 9 and can be comprised of an electrode 11 and a mounting support 13. The electrode 11 is mounted on and constrained to the mounting support 13. In some exemplary embodiments the mounting support 13 can be comprised of a first portion 13A and a second portion 13B. The mounting support 13 is in turn configured for connection to a tool holder or ram of an EDM apparatus, not shown.

The EDM electrode 11 is manufactured e.g. by chip removal using a CNC machine tool or the like based on a native 3D-model of the EDM electrode 11, i.e. the CNC 3D-model of the EDM electrode 11. The mounting support 13 is also manufactured based on a native 3D-model. The same support 13 can be used for different EDM electrodes 11.

Once the electrode 11 has been manufactured and assembled on the mounting support 13, to form the final EDM tool 9, accuracy of the tool 9 must be checked. The EDM tool 9 must on the one side meet geometrical tolerances, i.e. the geometrical shape and dimensions of the actual manufactured EDM electrode shall not deviate from the theoretical surface as defined by the native 3D-model more than predetermined tolerances.

According to some embodiments, not all tool portions or surfaces have to meet the same degree of accuracy. In general terms, some surface portions of the electrode must satisfy stricter tolerances, i.e. limited deviations from the theoretical shape as defined by the native 3D-model. These surface portions are usually those, which influence the final shape of the surface machined in the workpiece. Other surface portions of the EDM electrode 11 are less critical, as they do not directly act upon the workpiece and potential deviations from the theoretical shape as defined by the native 3D-model do not adversely affect the final EDM machining result. In some embodiments, two specific different areas are defined on the EDM electrode 11. These areas can be designated working area and holder area respectively. The working area is the one which directly acts upon the workpiece and the surface whereof directly determines the final shape of the impeller or other article of manufacture machined with the electrode 11. The holder area is the remaining area, used for the purpose of mounting the EDM electrode 11 on the mounting support, for instance.

The native 3D-model of the EDM electrode 11 can contain information on the tolerances to be met by each portion of the EDM electrode 11, i.e. by the working area and holder area, respectively. The native 3D-model of the EDM electrodes 11 is produced by an NX CAD automation tool, which guarantees the repeatability of tolerance management rules for all different native 3D-models generated.

When the EDM tool 11 is used for manufacturing vanes between adjacent blades of a centrifugal turbomachine impeller, the working area includes operating electrode surfaces which machine the suction surface and the pressure surface of the vane. Additional electrode surfaces machine the shroud surface and the hub surface of the vanes. The CAD automation tool can automatically define a plurality of points on the holder area and working area to be used for subsequent quality check of the manufactured EDM electrode as will be described in greater detail later on.

For the EDM electrode 11 to be used in the EDM apparatus, the EDM electrode 11 must be accurately mounted on the mounting support 13. The mounting support 13 has reference surfaces which define the final position of the tool on the tool holder of the EDM apparatus. An incorrect positioning of the EDM electrode 11 on the mounting support 13 causes inaccurate machining of the workpiece and eventually errors in the shape of the final manufactured article, such as deviations from the blade surface design of a turbomachine impeller, for example.

The method disclosed herein for checking the electrode accuracy is summarized as follows, reference being made to FIG. 4, while additional more detailed information will be provided later on Once the EDM electrode 11 has been manufactured based on the native 3D-model thereof, the EDM electrode 11 is mounted on the mounting support 13. The tool formed by the mounting support 13 and EDM electrode 11 mounted thereon is subject to a light scanning process: a plurality of images of the tool 9 in various positions are scanned by means of a light scanning apparatus. A 3D-model of the manufactured EDM electrode 11 is generated, based on the scanned images. The 3D-model of the manufactured EDM electrode 11 will be referred to herein below as "scanned 3D-model".

Light scanning is a well-known methodology for capturing the 3-D shape of an object. Devices implementing this methodology usually comprise a projector and a camera. The projector, typically a LCD projector or other stable light source, projects a pattern of light onto the subject. The camera, offset slightly from the pattern projector, looks at the deformation of the pattern on the subject and calculates the distance of every point in the field of view. With this methodology, instead of scanning one point at a time, structured light scanners scan multiple points or the entire field of view at once. Scanning an entire field of view in a fraction of a second reduces or eliminates the problem of distortion from motion.

The purpose of the scanned 3D-model of the manufactured electrode 11 obtained by light scanning is two-fold: to check if the EDM electrode 11 is machined according to geometrical tolerances; to check if assembly rules are respected, i.e. if the EDM electrode 11 is correctly positioned and oriented on the mounting support 13.

By using the native 3D-model and the scanned 3D-model of the manufactured actual EDM electrode 11 a machine tool offset is created, in order to recover errors due to assembly mate surface tolerances and a report-out for Quality and Manufacturing users is generated.

Figure 4:
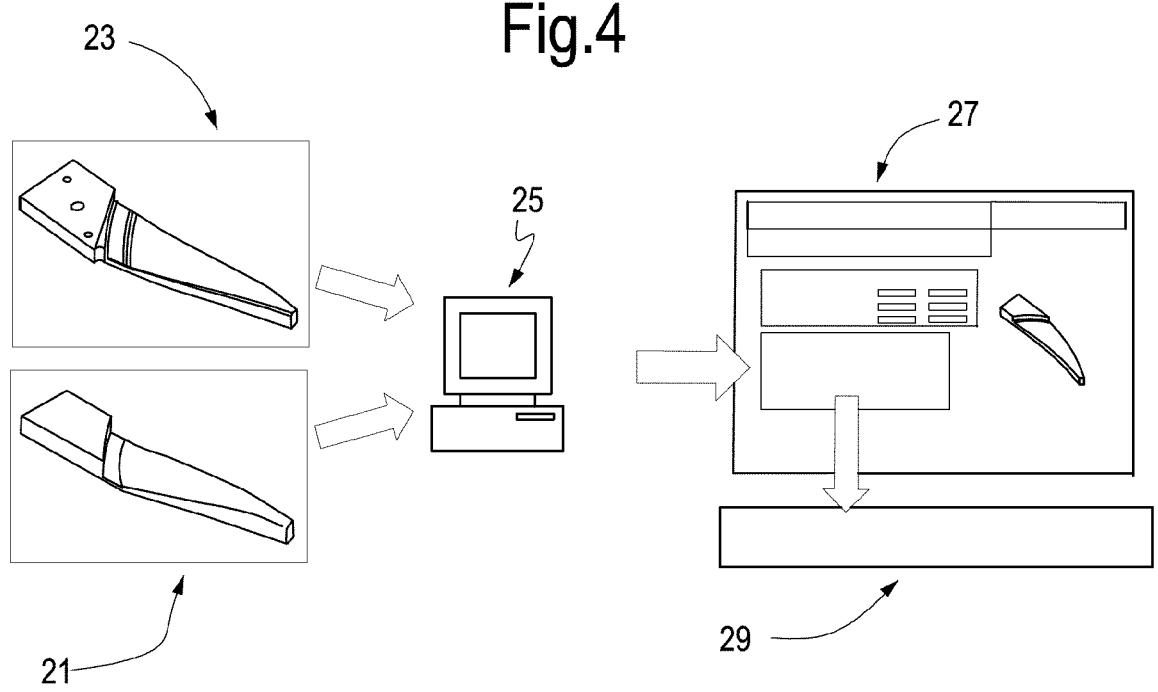
FIG. 4 illustrates an exemplary embodiment of a schematic diagram summarizing the method of the present disclosure.
Figure 9:
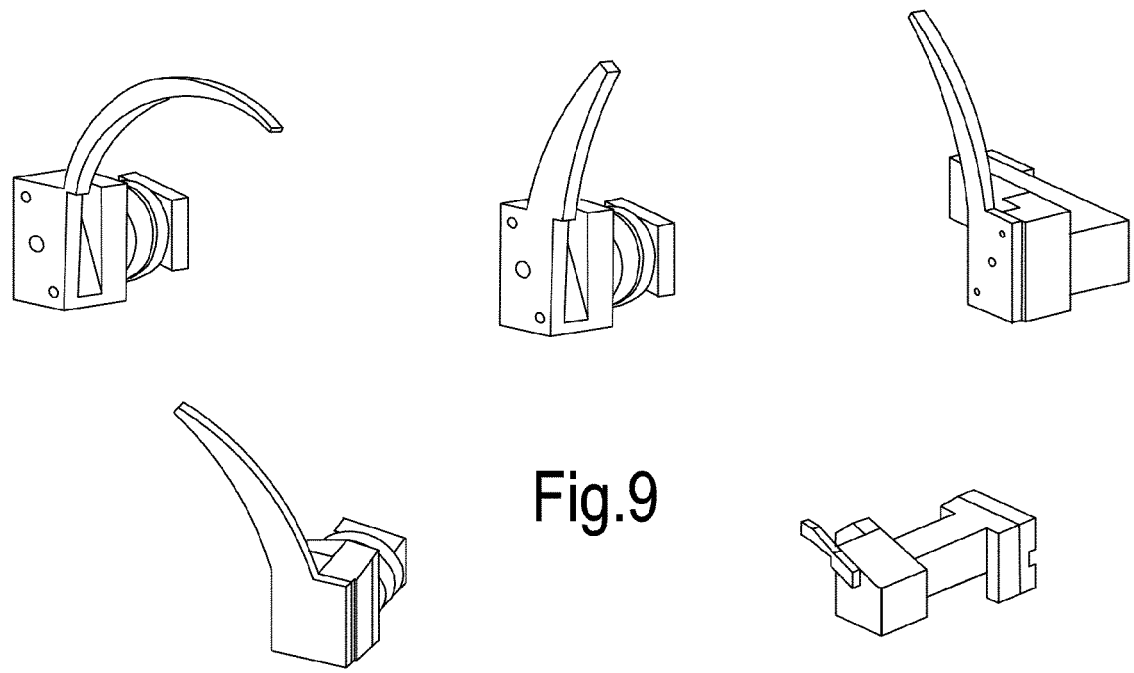
FIG. 9 illustrates exemplary embodiments of electrode families.
Figure 10:
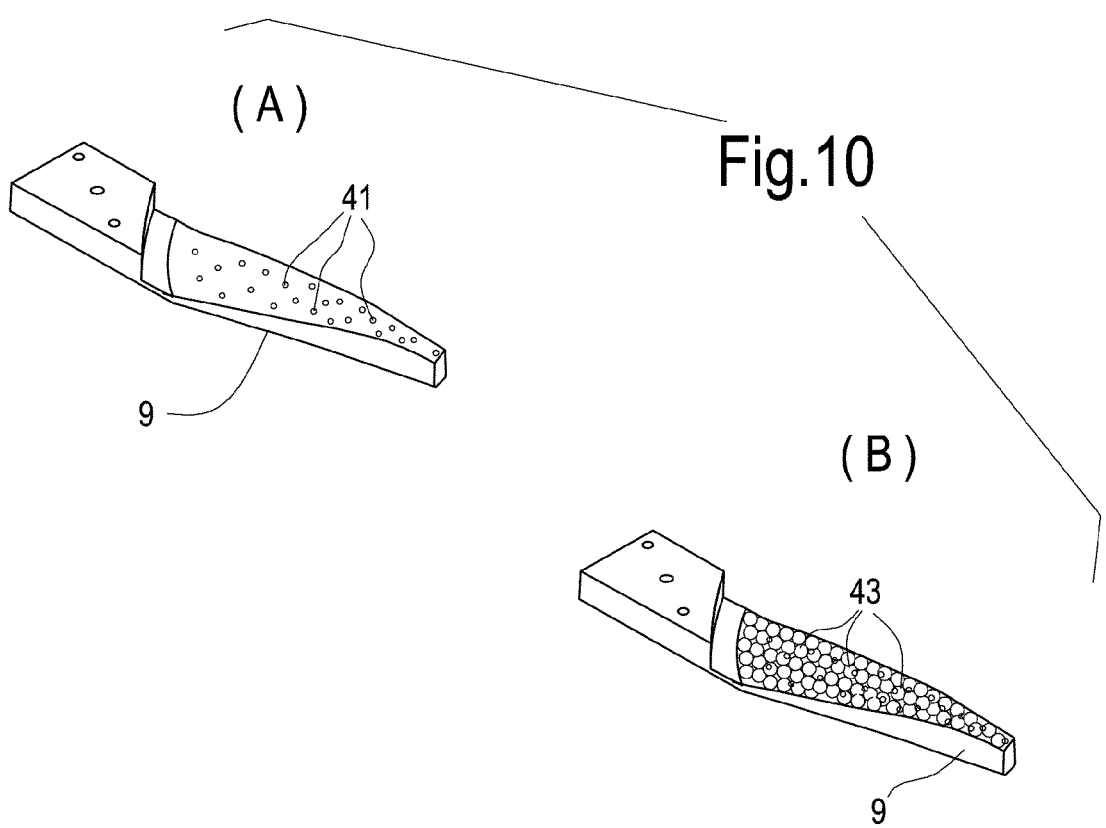
FIG. 10 illustrates an exemplary embodiment of the generation of spheres on the surface of the native 3D-model and on the surface of the scanned 3D-model of the manufactured EDM electrode, respectively.

In the schematic of FIG. 4 the native 3D-model is schematically shown at 21 and the scanned 3D-model is schematically shown at 23. The two 3D-models are compared, e.g. by means of computer 25, and a report 27 is generated. The report contains offset values for tool compensation 29, which are provided to the EDM apparatus for correcting the path along which the EDM tool 9 is moved during machining of the workpiece for compensating possible positioning errors of the EDM electrode 11 on the mounting support 13. The report also contains information on discrepancies between the actual dimensions and shape of the manufactured EDM electrode 11 and the native 3D-model, including indications as to whether the EDM electrode 11 satisfies the tolerances provided by the native 3D-model. If the EDM electrode 11 does not satisfy the ranges of tolerance, the electrode is discarded.

For the generation of the scanned 3D-model, according to some embodiments a light scanning arrangement or device 30 is provided, including at least one light scanning sensor, such as a camera 31, schematically shown in FIG. 5, and a movable table 33 whereon the EDM electrode 11 and relevant mounting support 13 are mounted. The movable table 33 is shown in detail in FIGS. 6A, 6B. In some embodiments, the movable table 33 can be a rotary and tilting table, provided with a chuck 35 movable around a rotary axis A and a tilting axis B. The rotary axis A and the tilting axis B can be orthogonal to one another. Once the EDM electrode 11 and its mounting support 13 are mounted on the movable table 33, a plurality of images of the EDM electrode in various positions 11 can be taken. The number of scanned images is sufficient to generate the scanned 3D-model. According to some embodiments, the scanned 3D-model of the manufactured EDM electrode 11 can be a file in STL format. The number of images and the positions of the EDM electrode 11 in which the images are taken depend upon the shape of the EDM electrode 11.

Before the light scanning arrangement 30 can be used for generating a scanned 3D-model of an actual manufactured EDM electrode 11, a machine coordinate system (MCS) shall be generated, which will subsequently be used for positioning the scanned 3D-model in the correct spatial position with respect to the coordinate system of the native 3D-model of the same electrode 11.

According to exemplary embodiments of the method disclosed herein, in order to generate the MCS, a plurality of three-dimensional bodies of known form and dimension are rigidly mounted on the movable table 33. In some embodiments the solid bodies are spherical bodies of known radius. As shown in the attached drawings, see e.g. FIGS. 6A, 6B, eight spheres 37 are provided, for instance. These spheres 37 are rigidly constrained to the movable table 33, at a distance from the chuck 35, and move integrally therewith when the movable table 33 is rotated and tilted around axes A and B.

According to some embodiments, the following procedure is applied, in order to generate the MCS. A qualified body is attached to the chuck 35 of the movable table 33 in a position which corresponds to the position where the tool 9 to be checked will subsequently be mounted. A qualified body as understood herein is a body having known geometrical shape and dimensions. The dimensions and shape characteristics of the qualified body are mapped in the software. The position of the center of the qualified body with respect to the chuck 35, once the qualified body is mounted on the chuck, is known. The qualified body is used as a target for a preliminary scanning process. In some embodiments the qualified body is a qualified cube.

Once the qualified body has been locked on the chuck 35, a plurality of images of the qualified body are scanned by means of the camera 31 of the light scanning arrangement or device 30. Each image contains a portion of the qualified body or cube and at least some of the reference spheres 37. The images thus scanned are used to generate a scanned 3D-model of the qualified body or cube and of the reference spheres 37 using the light scanning software. FIG. 7 schematically shows the 3D-model of the qualified body or cube, labeled 32, and of the spheres 37 generated by the scanning software.

Once the scanned 3D-model of the qualified body 32 and relevant spheres 37 has been created, a custom function of the light scanning device or arrangement 30 moves the scanned 3D-model from a default position/orientation to a position/orientation on the coordinate reference system of the light scanning arrangement centered with the chuck. This is made possible since the points and surfaces of the qualified body or cube are mapped in the software of the scanning device and referred to the center of the chuck, which is the origin or zero point of the coordinate reference system. It is thus possible to determine the exact position and alignment of the spheres with respect to the center of the coordinate reference system centered with the chuck.

Once the scanned 3D-model has been roto-translated and centered with the center of the chuck, the position of the centers of all spheres 37 with respect to the reference system of the light scanning arrangement is determined. The positions of the centers of the spheres 37 will be used during the electrode scanning process as will be described here below.

Once the light scanning arrangement 30 has been set-up as described above, the scanning process of an EDM electrode 11 can be performed.

The electrode scanning process starts by locking the EDM tool 9, comprised of electrode 11 and mounting support 13, on the chuck 35. FIG. 8 illustrates the EDM tool 9 mounted on the chuck 35 in a plurality of positions of the movable table 33. The EDM electrode 11 is mounted near the spheres 37 and preferably in a volume inside the set of eight spheres 37. A plurality of images of the system formed by the EDM tool 9 (EDM electrode 11 and mounting support 13) and of the spheres 37 are scanned and stored, to generate a scanned 3D-model of the manufactured electrode 11.

A large number of electrodes 11 of different shapes and dimensions can be used for manufacturing the same or different impellers. In order to optimize the scanning process, the EDM electrodes 11 can be classified according to electrode families. The EDM electrodes 11 belonging to the same family have similar geometrical shape and dimensions.

For a given family of similar EDM electrodes 11 to be scanned, a set of different pre-determined frames, i.e. images of the EDM electrode 11 is provided. Each set of frames includes a plurality of images, each corresponding to a given spatial position of the chuck 35. In this way, an optimized minimum number of images for each EDM electrode 11 is defined. The number of frames, i.e. of images required for obtaining a satisfactory light scanning of a given EDM electrode 11 depends upon the complexity of the electrode shape.

Each frame, i.e. each image of a given EDM electrode 11 will include at least a portion of the EDM electrode 11 and a certain number of spheres 37. In some embodiments, at least three spheres 37 are visible in each scanned image.

Once all frames, i.e. all images of the EDM electrode 11 have been scanned, the light scanning software generates therefrom the scanned 3D-model of the manufactured EDM electrode 11, which also contains the 3D-model of the spheres 37.

The scanned 3D-model thus generated is positioned and oriented randomly. The next step of the method involves correctly positioning the scanned 3D-model of the manufactured EDM electrode 11 and spheres 37 with respect to the MCS. A standard software functionality determines the center of each one of the spheres 37 in the scanned 3D-model. By means of a roto-translation matrix the scanned 3D-model is re-oriented and re-positioned until the centers of the spheres 37 of the scanned 3D-model of the manufactured EDM electrode 11 coincide with the position of the centers of the same spheres 37 in the scanned 3D-model generated during the set-up step of the light scanning arrangement 30, as described above.

As a result of the above procedure, the scanned 3D-model is centered and oriented in the MCS. This reference system is the same reference system of the native 3D-model of the same EDM electrode 11.

The orientation and the position of native 3D-model of the EDM electrode 11 are theoretically the same as those of the scanned 3D-model. However, due to tolerances of the mounting support 13 and to machining operation, as well as to possible mounting errors, the actual position and orientation of the scanned 3D-model generated by the light scanning device 30 can slightly deviate from the theoretical position and orientation as defined by the native 3D-model of the same EDM electrode 11.

The next procedure of the method disclosed herein determines whether these deviations can be compensated by tooling offset.

As mentioned above, a plurality of points have been defined by the CAD automation tool on holder area and working area of the native 3D-model of the EDM electrode 11. These points are used for determining the tool offset values required for compensating position and orientation mismatches between the actual EDM tool 9 and the theoretical EDM tool 9 as defined by the native 3D-model.

In FIG. 8A a set of exemplary points 41 applied on the native 3D-model of the EDM electrode are 11 shown.

The number and position of such points 41 on the surfaces of the native 3D-model of the EDM electrode 11 can vary depending upon the shape of the electrode as well as upon the higher or lower criticality of the surface involved. Surfaces which are more critical for a correct machining will be provided with a larger number of such points. In some embodiments, the points 41 used in this phase of the method are located on the suction side surface and pressure side surface of the EDM electrode 11.

In a subsequent step, a plurality of geometrical elements are applied on the native 3D-model at the chosen points 41. In some embodiments these geometrical elements are small spheres. Each small sphere can be centered at a respective one of said points 41. In FIG. 8B a plurality of said small spheres are shown at 43. Each small sphere is provided with an identification number ID and has a diameter. In some embodiments all the small spheres 43 have the same diameter.

The points 41 in the native 3D-model of the EDM electrode 11 imported by the light scanning software are projected on the surfaces of the scanned 3D-model of the manufactured EDM electrode 11. The projection is obtained by generating a straight line (orthogonal to CAD surface) passing through the selected point 41 and intersecting the surface of the scanned 3D-model. Were the two 3D-models identical and perfectly overlapping, the point 41 on the native 3D-model would coincide with the point 41 projected on the scanned 3D-model of the manufactured EDM electrode 11. Due to the above mentioned possible discrepancies and positioning errors, at least some of the points 41 on the native 3D-model will not coincide with the corresponding point projected on the scanned 3D-model.

In the next step, the light scanning software generates a plurality of small spheres 43, each corresponding to one of the small spheres 43 generated in the native 3D-model, centered on the projected points 41. Each small sphere thus generated by the light scanning software on the scanned 3D-model has the same diameter as the corresponding small sphere of the native 3D-model. The small spheres on the scanned 3D-model of the actual manufactured EDM electrode 11 do not coincide with the small spheres on the native 3D-model, due to the above mentioned mismatches.

In order to generate a roto-translation matrix which offsets the mismatches between native 3D-model and scanned 3D-model of the manufactured EDM electrode 11, the scanned 3D-model is displaced with respect to the native 3D-model, to minimize the distance between the two sets of small spheres 43. The displacements are usually along axes which correspond to the numerically controlled axes of the EDM apparatus.

In some embodiments the displacements can include a rotation around a rotation axis Z and translations along two mutually orthogonal translation axes X and Y. The Z-axis can be parallel to the chuck axis of the EDM apparatus and translation axes X, Y correspond to the translation axes of the EDM apparatus.

Rotation and translations of the two 3D-models one with respect to the other can be performed simultaneously or sequentially.

Once a new mutual position of the scanned 3D-model with respect to the native 3D-model has been achieved, the process can be reiterated once or more times, until the process converges towards a final mutual position of the two 3D-models and no further minimization of the small sphere distance can be obtained.

The total displacements according to the rotation axis Z and the two translation axes X and Y are used as offset values to correct the EDM tool 9 path in the EDM apparatus. In actual fact, the matrix defining the axes of the scanned 3D-model of the manufactured EDM electrode 11 is compared with the theoretical matrix defined by the native 3D-model. The result of the comparison is a rotation around the Z axis and a translation along the X and Y axes. These values are provided as output offset values for the EDM apparatus, which correct the trajectory of the EDM tool once mounted on the EDM apparatus. The offset values compensate possible mismatches of the electrode with respect to its theoretical position as defined by the native 3D-model.

The rotation and translations according the X, Y and Z axes is provide as an output from the data processing (see FIG. 4) and can be part of a quality report associated with the EDM electrode 11 being analyzed.

As mentioned, the shape and dimensional tolerances of the EDM electrode 11 shall also be checked. This is done using a standard free best fitting process using the same points where the small spheres 43 have been centered on the native 3D-model and on the scanned 3D-model of the EDM electrode 11. If the centers of the small spheres 43 used in calculating the off-set roto-translation matrix are applied only on the suction side and pressure side surfaces of the EDM electrode 11, additional points 41 are provided on the hub side and shroud side surfaces of the EDM electrode 11.

According to some embodiments, the free best fitting facility of the scanning software uses the points 41 located on the working area of the EDM electrode 11, neglecting the points 41 on the holder area. The free best fitting changes the position and orientation of the scanned 3D-model of the manufactured EDM electrode 11, until the points 41 of the scanned 3D-model match the corresponding points 41 on the native 3D-model of the same EDM electrode 11.

Once the two 3D-models have been best-fitted, a standard software routine of the scanning software compares the two 3D-models and, using the product manufacturing information provided on the native 3D-model, a colored EDM electrode 11 representation can be generated. The variance of the color shows the surface error map. The error surface map can be outputted e.g. in form of a file, such as a PDF file. The file can include additional information, such as maximum error found on the working area and on the holder area of the EDM electrode 11. For instance, green or red color can be used to show the maximum error found.

Figure 11A:
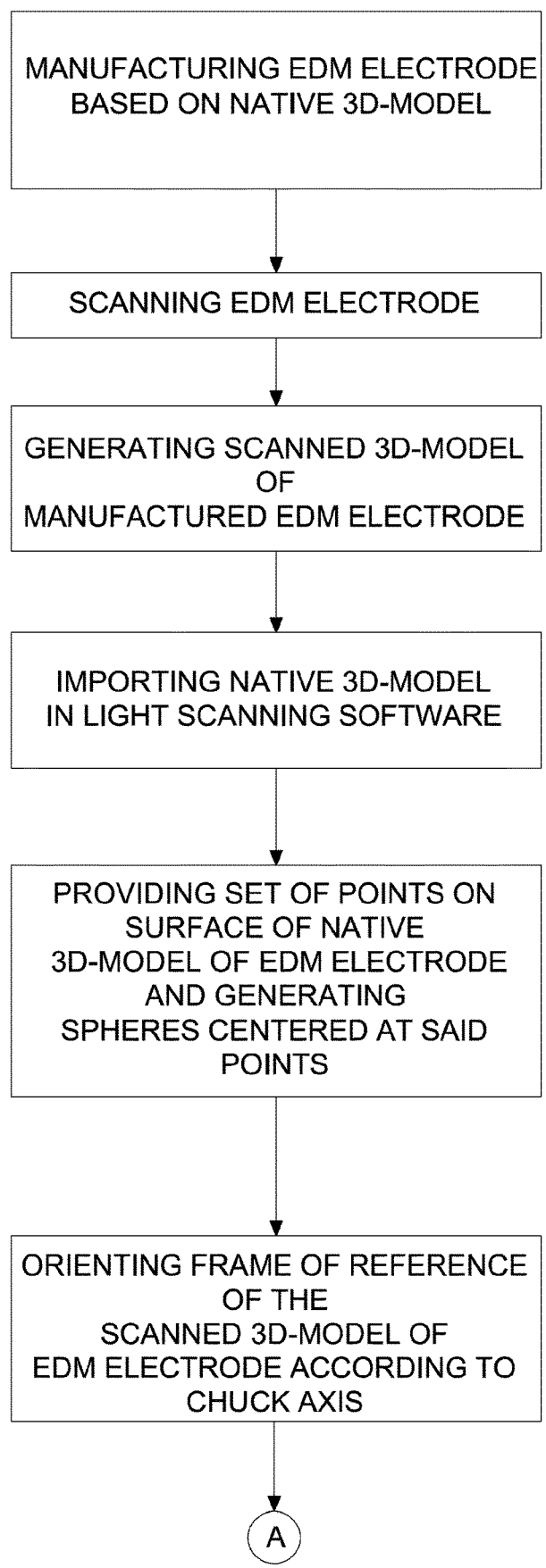
FIGS. 11A, 11B illustrate an exemplary embodiment of a flow diagram of the method.
Figure 11B:
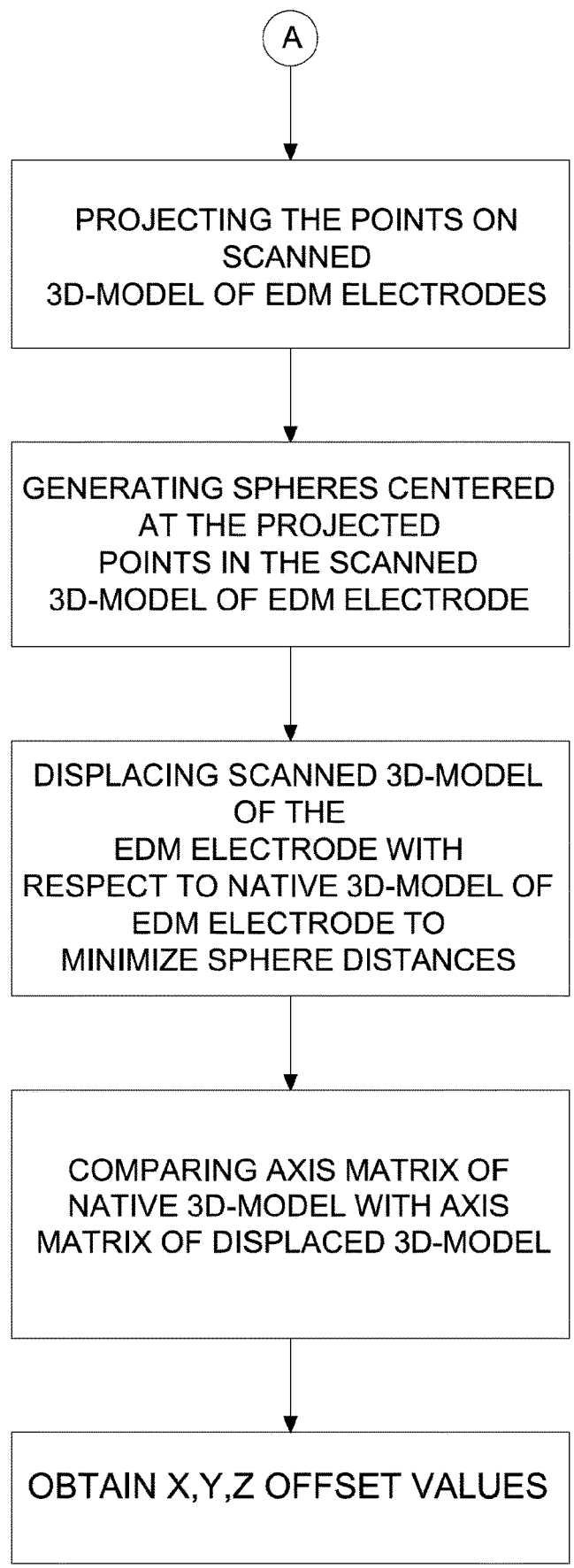

FIGS. 11A, 11B illustrate a flow diagram which summarizes the main steps of the method disclosed herein above.

While the disclosed embodiments of the subject matter described herein have been shown in the drawings and fully described above with particularity and detail in connection with several exemplary embodiments, it will be apparent to those of ordinary skill in the art that many modifications, changes, and omissions are possible without materially departing from the novel teachings, the principles and concepts set forth herein, and advantages of the subject matter recited in the appended claims. Hence, the proper scope of the disclosed innovations should be determined only by the broadest interpretation of the appended claims so as to encompass all such modifications, changes, and omissions. In addition, the order or sequence of any process or method steps may be varied or re-sequenced according to alternative embodiments.

What is claimed is:

1. A method for checking a geometry of an electric discharge machining electrode, the method comprising:
   providing a file containing a native 3D-model of the electric discharge machining electrode;
   providing a manufactured electric discharge machining electrode based on the native 3D-model;
   light scanning a set of images of the manufactured electric discharge machining electrode in different positions and generating a scanned 3D-model of the manufactured electric discharge machining electrode;
   comparing the native 3D-model and the scanned 3D-model and generating electrode compensation coordinates for an electric discharge machining apparatus, to correct an electrode path during electric discharge machining;
   defining a set of points on a surface of the electric discharge machining electrode in the native 3D-model;
   generating a set of geometrical elements centered at the points in the native 3D-model;
   projecting the set of points on the surface of the electric discharge machining electrode in the scanned 3D-model of the manufactured electric discharge machining electrode;

applying a set of geometrical elements centered at the points projected on the surface of the scanned 3D-model of the manufactured electric discharge machining electrode; and displacing the scanned 3D-model of the manufactured electric discharge machining electrode with respect to the native 3D-model to minimize a distance between the geometrical elements on the native 3D-model and the geometrical elements on the scanned 3D-model of the manufactured electric discharge machining electrode.

2. The method of claim 1, wherein the geometrical elements are spheres, each sphere being centered at a corresponding one of the set of points.

3. The method of claim 1, wherein the step of displacing the scanned 3D-model of the manufactured electric discharge machining electrode with respect to the native 3D-model further comprises:

rotating the scanned 3D-model of the manufactured electric discharge machining electrode around a rotation axis, and translating the scanned 3D-model of the manufactured electric discharge machining electrode along at least a first translation axis.

4. The method of claim 3, wherein the first translation axis and the rotation axis are mutually orthogonal.

5. The method of claim 1, further comprising the step of mounting the scanned electric discharge machining electrode on an electric discharge machining apparatus, wherein parameters defining the displacement of the scanned 3D-model of the manufactured electric discharge machining electrode are provided to the electric discharge machining apparatus and used by the electric discharge machining apparatus as offset values for controlling the electric discharge machining electrode mounted on the electric discharge machining apparatus.

6. The method of claim 4, wherein a rotation displacement around the rotation axis, a first translation displacement along the first translation axis and a second translation displacement along a second translation axis are used as offset values in the electric discharge machining apparatus equipped with the electric discharge machining electrode.

7. A method for checking a geometry of an electric discharge machining electrode, the method comprising:

providing a file containing a native 3D-model of the electric discharge machining electrode;

providing a manufactured electric discharge machining electrode based on the native 3D-model;

light scanning a set of images of the manufactured electric discharge machining electrode in different positions and generating a scanned 3D-model of the manufactured electric discharge machining electrode; and comparing the native 3D-model and the scanned 3D-model and generating electrode compensation coordinates for an electric discharge machining apparatus, to correct an electrode path during electric discharge machining, wherein the electric discharge machining electrode comprises a holder area, intended for connection of the electric discharge machining electrode to a mounting support, and a working area, intended for co-action with a workpiece to be machined; the working area comprises a suction surface and a pressure surface configured for machining a suction surface and a pressure surface of an impeller vane of a turbomachine, and further comprises a shroud surface and a hub surface configured for machining a shroud surface and a hub surface of the impeller vane; and the geometrical elements are applied on points located on the suction surface and on the pressure surface, but not on the shroud surface and on the hub surface.

8. The method of claim 1, wherein the step of light scanning a set of images of the manufactured electric discharge machining electrode comprises the step of: rotating and tilting the manufactured electric discharge machining electrode around a rotation axis and around a tilting axis and scanning images of the manufactured electric discharge machining electrode in a plurality of positions thereof.

9. A method for checking a geometry of an electric discharge machining electrode, the method comprising:

providing a file containing a native 3D-model of the electric discharge machining electrode;

providing a manufactured electric discharge machining electrode based on the native 3D-model;

light scanning a set of images of the manufactured electric discharge machining electrode in different positions and generating a scanned 3D-model of the manufactured electric discharge machining electrode; and comparing the native 3D-model and the scanned 3D-model and generating electrode compensation coordinates for an electric discharge machining apparatus, to correct an electrode path during electric discharge machining, wherein the step of light scanning the set of images of the manufactured electric discharge machining electrode comprises light scanning images of a plurality of geometric elements integrally moving with the manufactured electric discharge machining electrode; the scanned 3D-model of the manufactured electric discharge machining electrode contains the plurality of geometric elements; and the step of comparing the native 3D-model and the scanned 3D-model of the manufactured electric discharge machining electrode comprises a preliminary step of generating a coordinate system for spatially positioning the scanned 3D-model relative to a spatial position of the native 3D model.

10. The method of claim 9, wherein the elements are spheres.

11. A method for checking a geometry of an electric discharge machining electrode, the method comprising:

providing a file containing a native 3D-model of the electric discharge machining electrode;

providing a manufactured electric discharge machining electrode based on the native 3D-model;

light scanning a set of images of the manufactured electric discharge machining electrode in different positions and generating a scanned 3D-model of the manufactured electric discharge machining electrode; and comparing the native 3D-model and the scanned 3D-model and generating electrode compensation coordinates for an electric discharge machining apparatus, to correct an electrode path during electric discharge machining, wherein the native 3D-model contains information on geometric tolerance ranges, which the manufactured electric discharge machining electrode must match, and wherein the method further comprises the step of checking if the scanned 3D-model of the manufactured electric discharge machining electrode matches the tolerance ranges.

12. The method of claim 11, wherein different tolerance ranges are applied to different portions of the manufactured electric discharge machining electrode in the native 3D-model.

13. The method of claim 11, wherein a free best fitting of the native 3D-model and the scanned 3D-model of the manufactured electric discharge machining electrode is performed prior to checking if the scanned 3D-model matches the tolerance ranges.

14. The method of claim 13, wherein the free best fitting is performed using a plurality of points on the native 3D-model and corresponding points on the scanned 3D model of the manufactured electric discharge machining electrode.

15. The method of claim 14, wherein the manufactured electric discharge machining electrode comprises a holder area and a working area; wherein the working area is configured and arranged for co-acting with a workpiece to be machined; wherein the holder area is configured and arranged for connection of the manufactured electric discharge machining electrode on a mounting support, and wherein the plurality of points are arranged on the working area but not on the holder area.

\* \* \* \* \*